US006211637B1

(12) United States Patent
Studer

(10) Patent No.: US 6,211,637 B1
(45) Date of Patent: Apr. 3, 2001

(54) CONTAINER FOR POLLUTED AND/OR CONTAMINATED MATERIALS

(76) Inventor: Hans-Jörg Studer, Hurdstrasse 5, Hittnau CH-8335 (CH)

( * ) Notice: Subject to any disclaimer, the term of this patent is extended or adjusted under 35 U.S.C. 154(b) by 0 days.

(21) Appl. No.: 09/269,364

(22) PCT Filed: Oct. 11, 1996

(86) PCT No.: PCT/CH96/00359

§ 371 Date: Mar. 24, 1999

§ 102(e) Date: Mar. 24, 1999

(87) PCT Pub. No.: WO98/16446

PCT Pub. Date: Apr. 23, 1998

(51) Int. Cl.[7] .......... G05B 5/00

(52) U.S. Cl. .......... 318/466; 318/16; 318/480; 318/280; 318/286; 318/466; 318/283; 318/285; 318/264; 318/267; 318/468

(58) Field of Search .......... 318/16, 480, 280, 318/286, 466, 283, 285, 264, 265, 266, 267, 468, 558; 4/213

(56) References Cited

U.S. PATENT DOCUMENTS 5,351,381 * 10/1994 Case .......... 318/480
5,369,810 * 12/1994 Warren .......... 4/213
5,810,201 * 9/1998 Besse et al. .......... 318/16
5,878,444 * 3/1999 Convoy .......... 318/16

* cited by examiner

*Primary Examiner*—Karen Masih

(57) ABSTRACT

Soiled and/or contaminated objects often have to be collected before they are specifically disposed of.

According to the invention, in order to prevent blockages in toilets and sewers, a contactlessly operating container (1) is used which has a lid (2) which opens when a hand or an object approaches a proximity detector (50).

The container (1) is suspendable from a supporting housing (12) accommodating the entire control means, the drive and the power supply.

A preferred use of the device is the disposal of sanitary towels (14) which are immersed in a gel (15). The container (1) is periodically replaced by a clean container so that satisfactory hygiene conditions can also be maintained in frequently used toilet areas.

9 Claims, 4 Drawing Sheets

CONTAINER FOR POLLUTED AND/OR CONTAMINATED MATERIALS

The present invention relates to a device according to the preamble of claim 1 and to the preferred use thereof.

A container for kitchen waste is known from U.S. Pat. No. 4,996,467 and is provided on its front surface with infrared sensors which detect a potential user and actuate an electric stepping motor which opens a lid on top of the container via a cable pull. The stepping motor is designed for clockwise and counter-clockwise rotation. It opens the lid during a predetermined period, for example 30 s, and closes it by electrical reversal of the direction of rotation. The cable pull engages a lever-type extension of the lid so that, during the entire process, the electric motor has to overcome the turning moment generated by the lid and has a correspondingly high energy requirement.

The necessary, relatively high output of the stepping motor and its high energy requirement, which excludes battery operation and necessitates a mains power supply, are consequently disadvantageous.

It is generally known that, in public toilets, in hotels and also at home, objects are thrown into the toilets, blocking them and often even preventing drainage into the sewers.

The reason for this behaviour, which has serious consequences, is usually because suitable containers are not provided at the desired site of disposal and/or they are unpleasant to use.

Therefore, the object of the invention is to provide a device, by means of which soiled and/or contaminated objects and materials can be collected without it being necessary to touch the outside of the containers provided, in particular their openings and closures.

The device must function with minimal auxiliary power so that battery-operated versions are also feasible. In addition, it must be manually operable, for example if there is insufficient or no supply voltage.

This object is achieved by the features of claim 1.

The invention prevents soiled and/or contaminated objects from coming into contact with the opening region of the container and eliminates the need to touch the container, either with one's hands or by means of implements.

The defined opening angle of the lid, ensured by the drive mechanism, also prevents objects from missing the container and polluting the environment.

The resulting, gravitationally induced replacement of the lid is especially energy-saving. The cable-operated drive mechanism causes only slight friction losses and therefore also requires only a small amount of electrical energy.

If necessary, the lid can be opened by hand without damaging the drive.

The formation of the cable pull by means of a pivoted lever is kinematically advantageous and very economical.

Further developments of the subject of the invention are described in dependent claims.

The use of gearwheels according to claim 2 provides non-slip force transmission.

The device according to claim 3 causes deflection of the pivoting movement, preferably through 90°, so that the resulting rotation movement is directly or indirectly transmittable to the lid.

The arrangement according to claim 4, which is preferably formed integrally with the pivoted lever and separately from the rocker arm, is particularly space-saving and can advantageously be manufactured by plastics die casting.

The arrangement according to claim 5 is particularly advantageous; it enables the device to be wall-mounted.

The embodiment according to claim 6 ensures very easy replacement of the containers.

According to claim 7, the power supply is not switched on until a container has been mounted ready for use.

A self-contained power supply—by means of batteries and/or solar cells (photovoltaic)—ensures universal use of the device, also in locations at which there is no mains voltage.

A preferred embodiment of the invention will be described in the following with reference to drawings, wherein:

FIGS. 2 to 4 show three views of the container according to FIG. 1 in the dismounted state, wherein FIG. 4 shows the container with open lid;

Figure 1:
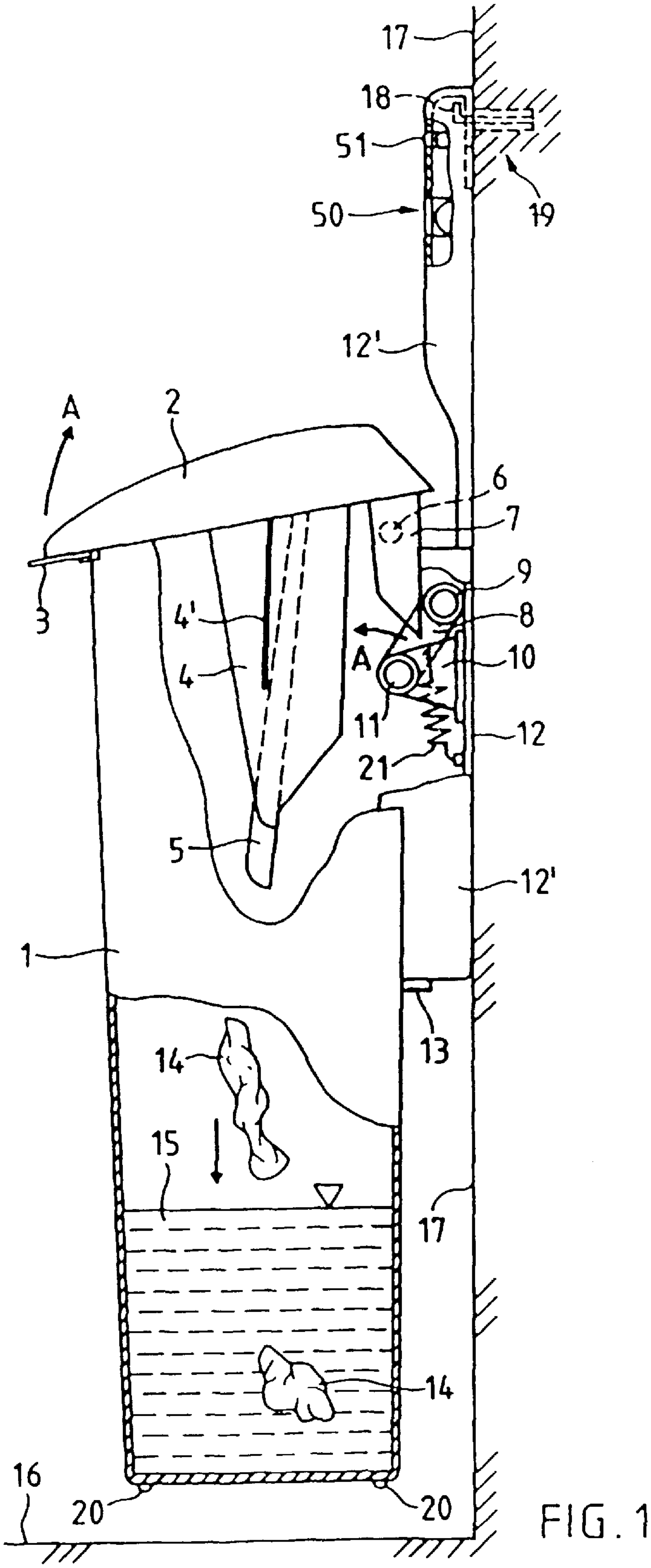
FIG. 1 shows a part sectional side view of a device for the disposal of sanitary towels in a toilet area.

In FIG. 1, 1 designates a replaceable container comprising a lid 2 having a gripping plate 3 serving chiefly as decoration.

The container 1 is shown partly in section. A sidewall 4 is provided on the lid 2 and has ribs 5 facilitating the sliding down of materials. The lid 2 is pivotable about internal pins 6 arranged on a rhomboidal link 7. A rocker arm 8 is also shown which has a cam 9 resting against the rear surface of the link 7. The rocker arm 8 is pivotable about a pivot pin 11 mounted in a supporting flange 10. A restoring spring 21 engages the rocker arm 8.

For reasons of stability, the cam drive described above is of twin construction, i.e. symmetrically constructed on either narrow side of the lid 2.

The "open" movement of the lid 2 and the pivot path of the rocker arm 8 are designated by A.

The lower part of the container 1 is filled with a deodorising gel 15, in which thrown-in sanitary towels land.

Owing to the secure closure of the lid 2 and the deodorising gel which is mixed with a conventional disinfectant (camphor), decomposition odours also cannot pass into the environment for a relatively long time.

The container 1 is suspended from a supporting housing 12 accommodating the entire drive mechanism with the power supply and control means under the housing cover 12'.

The floor 16 and part of the wall 17 of the toilet are shown. A wall hook 18 is attached to the wall 17 by means of a fixing 19, the wall hook 18 projecting through an eye in the supporting housing 12 and carrying the latter. A status indicator 51 is provided in the surface of the housing cover 12' and signals the readiness of the device for use. A proximity detector 50 is flush-mounted below the status indicator 51. In order to prevent unauthorised opening of the device, it is securable by a lock 13.

Figure 2:
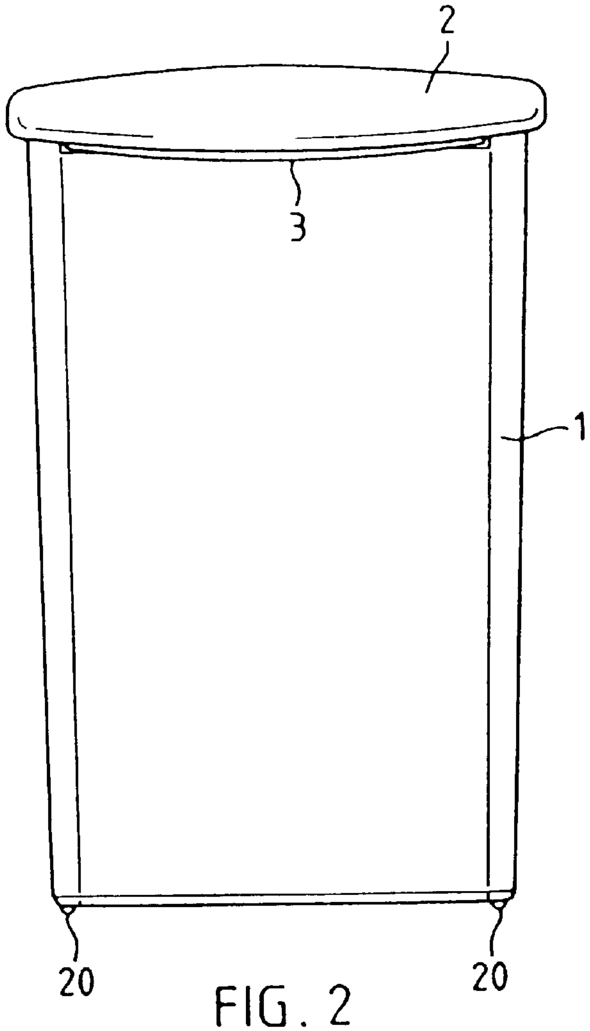

FIG. 2 shows a front view of the container 1. The lid 2 and the lip-type gripping plate 3 can also be seen. Projections 20 are provided underneath the container 1 and allow the replaceable container 1 to stand steady on the floor, for example during its replacement.

Figure 3:
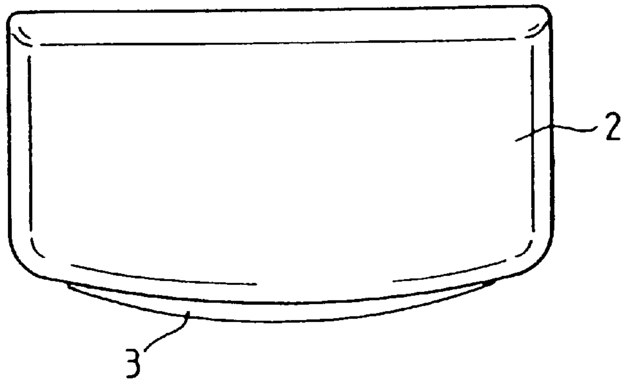

The plan view according to FIG. 3 again shows the lid 2—this time the external form thereof—and the projecting gripping plate 3 which, if necessary enables the container 1 to be easily opened manually, is aesthetically pleasing and provides additional weight for restoring the container 1 to the closed state.

Figure 4:
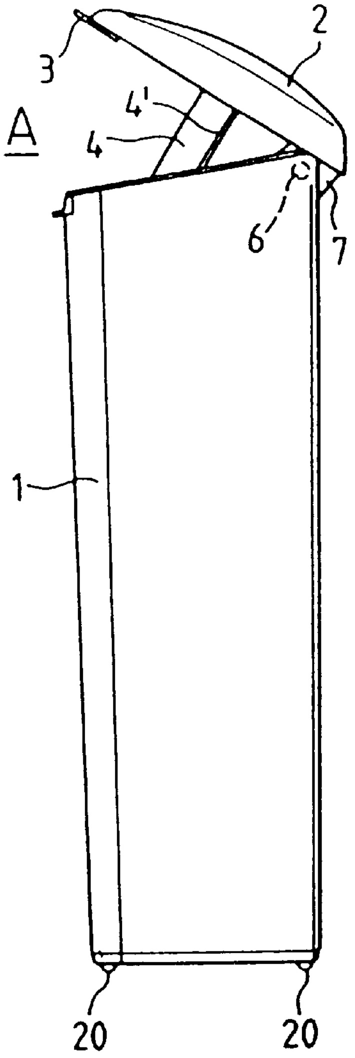

The side view according to FIG. 4 shows the container 1 in the open state A. The further form of the gripping plate 3, the lid 2 with its sidewalls 4 and reinforcing ribs 4', and a link 7 with its concealed pin 6, acting as a pivot, can also be seen.

Figure 5:
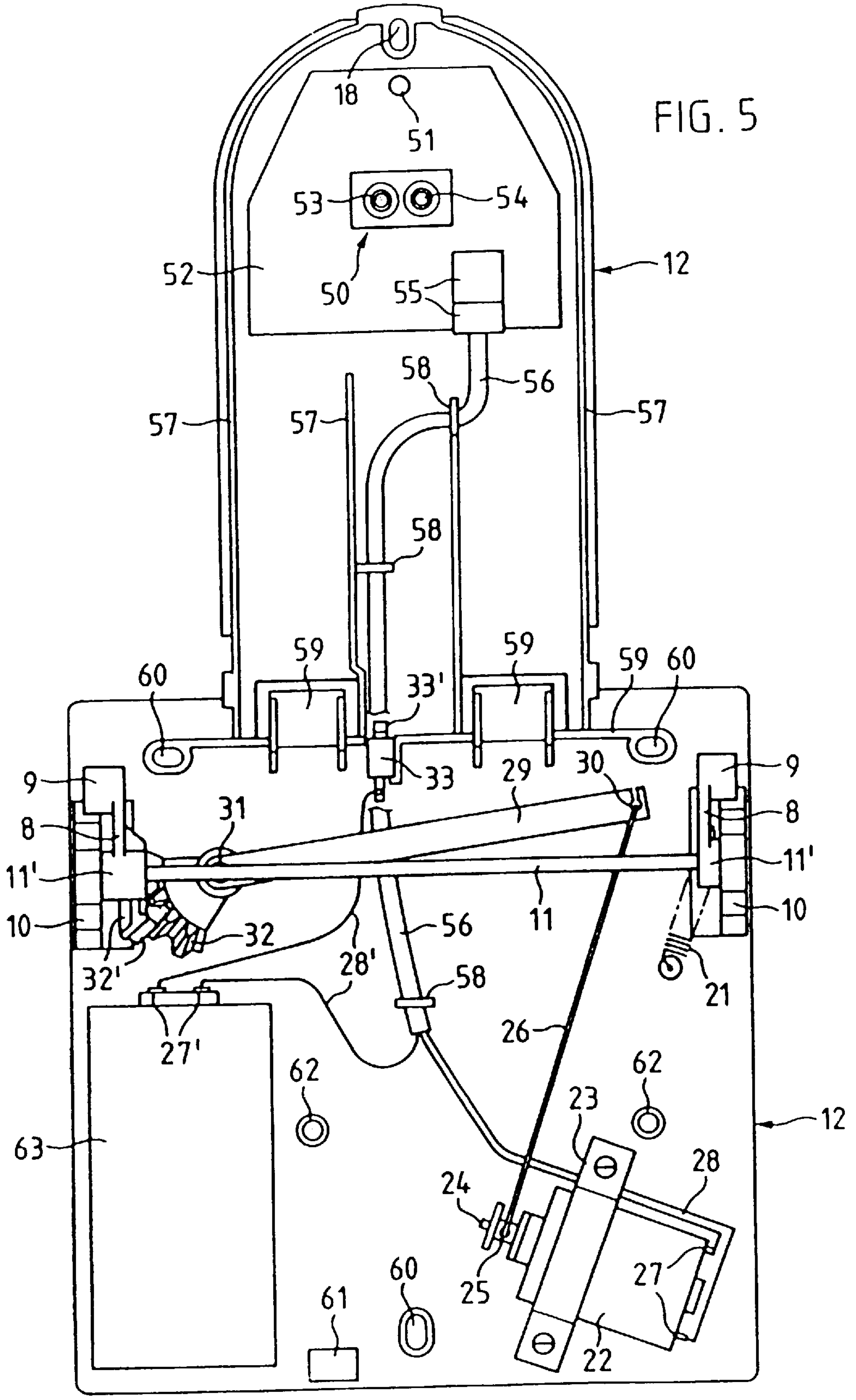
FIG. 5 shows the supporting housing according to FIG. 1, without the housing cover and with its drive mechanism and the associated control electronics with proximity detector.

FIG. 5 shows all the components arranged on the supporting housing 12. This support 12 is suspended from a hook on a wall by means of its eye 18 and is fixed to the wall by means of mounting bores 60. Carrying tabs 59, provided for suspending the above-described container 1, are also integrally connected to the supporting housing 12. The presence of a container 1 is signalled by a microswitch 33 mounted on the supporting housing 12, a contact spring 33' provided on the microswitch 33 being actuated and the device being electrically connected ready for use by the weight of the container 1.

The whole assembly is protected by a housing cover 12' (not shown in this Figure) positioned on reinforcing boundary strips 57 and centering pins 62 and secured by a locking member 61.

The electric motor 22, provided for driving the lid 2, is mounted in the bottom right-hand corner of the supporting plate 12 by means of clamps 23. The motor spindle 24 carries a small pulley 25 in which a thin cable 26 is secured by a knot in a bore (not shown). The electric motor 22 is powered via Its connecting terminals 27 by way of power supply lines 28, 28' leading to further connecting terminals 27' arranged on a battery box 63 and providing a terminal voltage of 6V direct current.

The other end of the cable 26 is knotted in a bore 30 provided in a pivoted lever 29 having a pivot pin 31 on the left-hand side. Gearwheel segments 32 are integrally connected to the plastics lever 29. They form part of a bevel-gear transmission and mesh, at an angle of 45°, with further gearwheel segments 32' which are connected to a pivot pin 11 with a lateral bearing 11' and carry a cam 9. The transmission is mounted in the plane orthogonal to the supporting housing 12 in a supporting flange 10.

The opposing bearing is formed analogously, although a restoring spring 21 additionally engages the cam 9 on the right-hand side.

All the connecting cables 56, secured by cable fixings 58, lead to a plug-and-socket connection 55 attached to a circuit board 52. Apart from the electronic components shown in the block diagram according to FIG. 6. the proximity detector 50 with its transmitter, the LED 53 and the receiver, the photodiode 54 and the status indicator 51 can also be seen on the circuit board 52 according to FIG. 5.

Figure 6:
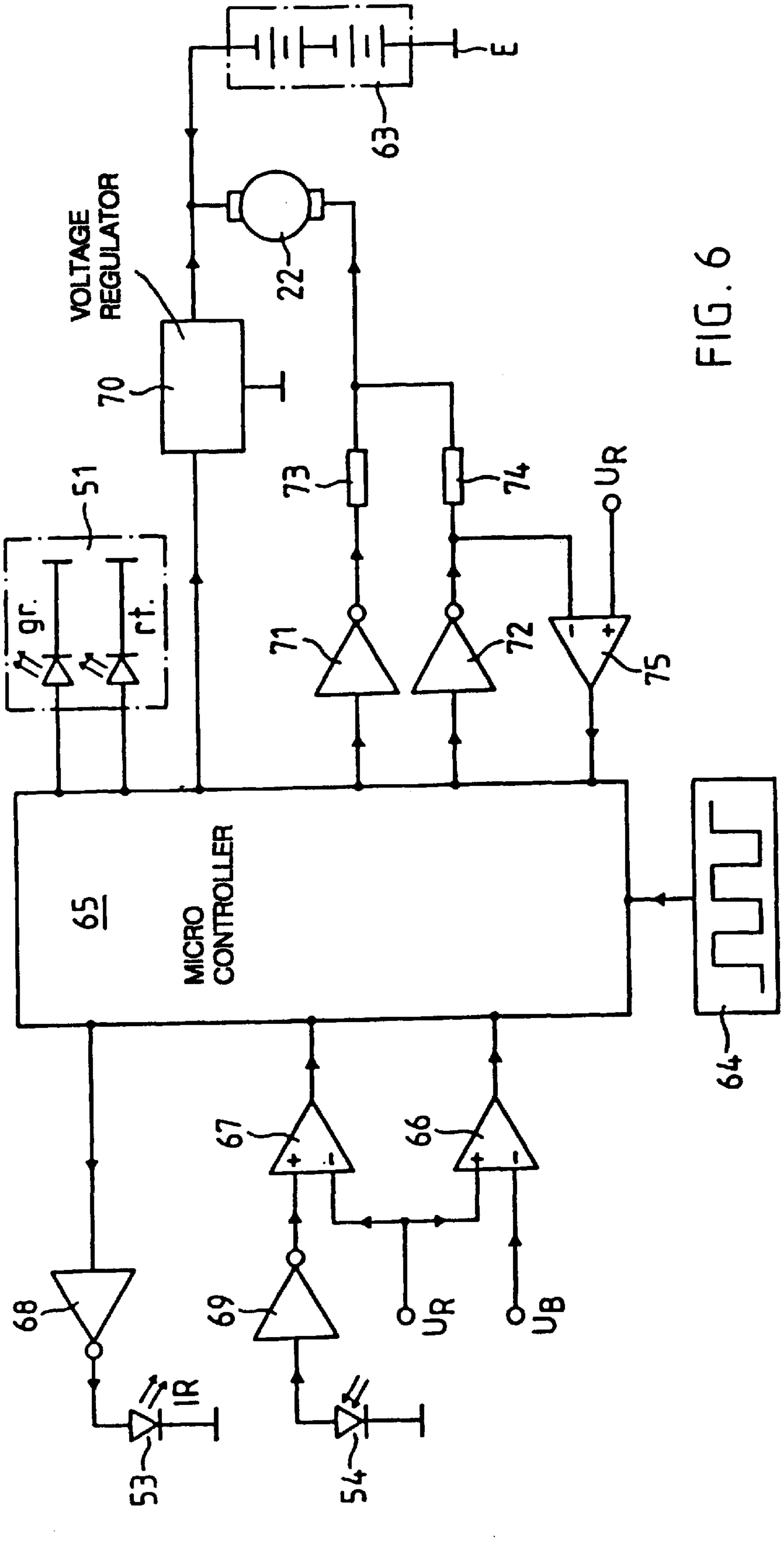
FIG. 6 shows a simplified block diagram of the control means for the lid.

The block diagram according to FIG. 6 shows the electronic control means for the drive mechanism according to FIG. 5. All parts are commercially available and are adapted to the specific use in a manner known per se.

A microcontroller 65 is controlled by a conventional timing generator 64. One output of the microcontroller 65 is used to activate an LED 53 emitting infrared radiation via an amplifier 68, a driver. During operation, this IR radiation is received by a photodiode 54. The output signal of the photodiode 54 is sent via on amplifier 69 to an input of a comparator 67; a reference voltage $U_R$ is switched on at the second input and is also supplied to a further comparator 66. The battery voltage $U_B$, drawn from the battery box 63, is provided at the second input of the comparator 66. Both outputs of the comparators 66 and 67 lead to the microcontroller 65. A status indicator 51 is connected up at two further outputs of the microcontroller 65 and has two LEDs, one of which—designated by gr. (green)—signals readiness for use, while the other—designated by rt. (red)—indicates interruption of operation.

A voltage regulator 70 and amplifiers 71 and 72, which are each connected as drivers and lead to one terminal of the electric motor 22 via bridge resistors 73, 74, are provided at further outputs of the microcontroller 65. The second terminal of the electric motor 22 is connected on the one hand to the positive pole of the 6 volt source contained in the battery box 63, and on the other hand to the single output of the voltage regulator 70.

The negative pole of the battery is connected to the common earth, here designated by E.

A further comparator 75 regulates the current of the electric motor 22, the one input being arranged between the output of the amplifier 72 and the bridge resistor 74, and the other input being connected to the reference voltage $U_R$. The output of the comparator 75 is connected to a further input of the microcontroller 65.

The reference voltage $U_R$ is generated in the microprocessor of the controller 65.

If the radiation from the LED 53 is reflected onto the photodiode 54 by a hand and/or an object, the electric motor 22 begins to turn for 0.6 s and the cable 26 is wound up; see FIG. 5.

As a result, the pivoted lever 29 pivots downwards. The movement is transmitted to the pivot pin 11 via the transmission 32, 32', thereby moving the cams 9 away from the supporting housing 12, i.e. away from the wall 17 in accordance with FIG. 1. This causes the cams 9 to push against the links 7 and thereby open the lid 2 in the direction A.

After 3 s, the lid 2 falls back into the rest position under its own weight; the container 1 is closed.

The circuit arrangement is dimensioned and adapted so that repeated opening attempts over a period of 3 s are ineffective, with the result that unauthorised access to the interior of the container 1 is at least made more difficult.

A microcontroller 65 of the PICI6C620-04P type (trademark MICROCHIP, USA). a voltage regulator 70 of the LM2936Z-5 type (MICROCHIP) and an electric motor, of the RSS459HH242 direct-current motor type (trademark MARBUCHI. JP) have proved successful.

The motor output is 5 W with a rated speed of 700 rpm.

The device guarantees trouble-free operation for over a year with an average of 25 openings per day with four conventional single cells (1.5V batteries).

In practice, the containers are replaced at shorter or longer intervals, depending on the frequency of use, their contents are centrally disposed of and the containers are cleaned and reused. It has been shown that only a minimal quantity of gel is necessary because a vaporous atmosphere develops inside the container and satisfies all hygiene requirements.

Naturally, the invention is not restricted to use in toilet areas. With few modifications, it can be adapted for use in chemical laboratories, operating theatres and research laboratories.

Thus, for example, the container can be provided with chemical-resistant and/or radiation-absorbing materials and the lid can be provided with suitable seals. The contact pressure of the lid on the container edge can easily be adjusted by selecting the gripping plate accordingly. The deodorising gel can also be replaced by other substances such as disinfectants, absorbers or moderators.

LIST OF REFERENCE NUMERALS

1 Container (replaceable)
2 Lid (pivotable)
3 Gripping plate (weight)

4 Sidewall
4' Reinforcing rib on 4
5 Ribs (chute)
6 Pin (pivot)
7 Links (lateral)
8 Rocker arm
9 Cam
10 Supporting flange
11 Pivot pin
11' Lateral bearings
12 Supporting housing with drive and control means
12' Housing cover
13 Lock (securing means)
14 Soiled materials (sanitary towels)
15 Deodorising gel
16 Floor (washroom, toilet)
17 Wall
18 Wall hook—eye
19 Fixing
20 Supporting surface
21 Restoring spring
22 Electric motor (direct current)
23 Mounting clamp
24 Motor spindle
25 Pulley on 24
26 Cable (cord)
27, 27' Connecting terminals
28, 28' Power supply line (cable)
29 Pivoted lever
30 Bore (for cable fastening)
31 Pivot pin
32, 32' Transmission/Gearwheel segments (bevel gears)
33 Microswitch
33' Contact spring of 33
50 Proximity detector
51 Status indicator (readiness)
52 Circuit board
53 LED (IR)
54 Photodiode (receiver)
55 Plug-and-socket connection
56 Connecting cable
57 Reinforcing boundary strips
58 Cable fixings
59 Carrying tabs
60 Mounting bores
61 Locking member for 13
62 Centering pins for 12'
63 Power supply/battery box (6V source)
64 Timing generator
65 Microcontroller
66, 67 Comparators
68 Amplifier (LED driver)
69 Amplifier
70 Voltage regulator
71, 72 Amplifier (driver)
73, 74 Bridge resistors
75 Comparator (motor current)
A "open" movement/open state
E Common earth (negative pole)
$U_B$ Battery voltage
$U_R$ Reference voltage

What is claimed is:

1. A device for the disposal of soiled and/or contaminated materials, comprising a container closeable by a lid pivotable between a first closed position and a second open position, a drive mechanism having a motor and comprising means for pivoting the cover from the first closed position to the second open position during motor activation and for pivoting the cover from the second open position to the first closed position without motor assist when the motor is deactivated, and a proximity detector coupled to said motor.

2. The device of claim 1, wherein said drive mechanism further comprises a transversely-extending pivoting lever coupled to the motor by a cable connected to a first end of the pivoting lever, the pivoting lever being pivotly mounted at a second end, said pivoting lever second end being coupled through a transmission to a transversely-extending rocker arm having at least one cam at an end thereof for deflecting the pivotable lid into said second open position when the motor is activated.

3. A device according to claim 1, characterised in that the drive mechanism and the proximity detector are mounted on a common supporting housing (12).

4. A device according to claim 1, characterised in that it has a self-contained power supply (63).

5. A device according to claim 1, characterised in that the transmission (32, 32') comprises two gearwheels.

6. A device according to claim 5, characterised in that the gearwheels are gearwheel segments (32, 32') and are formed in part as bevel gears.

7. A device according to claim 6, characterised in that the gearwheel segments (32, 32') are each frictionally connected to the pivoted lever (29) and the rocker arm (8).

8. A device according to claim 3, characterised in that at least one carrying tab (59), from which the container (1) is suspendable, is provided on the supporting housing (12).

9. A device according to claim 8, characterised in that a microswitch (33) is provided in the region of one carrying tab (59) and switches on the power supply when the container (1) has been mounted.

* * * * *